US012760849B2

(12) United States Patent
Yoshida et al.

(10) Patent No.: US 12,760,849 B2
(45) Date of Patent: Oct. 13, 2026

(54) LIGHTING DEVICE

(71) Applicant: Japan Display Inc., Tokyo (JP)

(72) Inventors: Masato Yoshida, Tokyo (JP); Hirofumi Ohira, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 19/197,333

(22) Filed: May 2, 2025

(65) Prior Publication Data

US 2025/0361992 A1 Nov. 27, 2025

(30) Foreign Application Priority Data

May 23, 2024 (JP) ................................ 2024-084258

(51) Int. Cl.

*F21K 9/68* (2016.01)
*F21V 9/20* (2018.01)
*F21Y 115/10* (2016.01)

(52) U.S. Cl.

CPC .................. *F21K 9/68* (2016.08); *F21V 9/20* (2018.02); *F21Y 2115/10* (2016.08)

(58) Field of Classification Search

CPC ....... F21K 9/68; F21V 9/20; B60K 2360/339; B60K 2360/34; B60Q 3/10; B60Q 3/54; B32B 2605/003; G09F 13/06; G09F 13/14; G09F 13/147

See application file for complete search history.

(56) References Cited

U.S. PATENT DOCUMENTS

2009/0056183 A1* 3/2009 Reiland .................. G02B 6/006 40/564
2017/0282716 A1* 10/2017 Mochizuki ........... B60K 35/214
2020/0198535 A1* 6/2020 Kontani ................. B60K 35/21
2022/0227292 A1* 7/2022 Basquin .................. B60Q 3/54

FOREIGN PATENT DOCUMENTS

JP 2020-101781 A 7/2020

* cited by examiner

*Primary Examiner* — Erin Kryukova

(74) *Attorney, Agent, or Firm* — K&L Gates LLP

(57) ABSTRACT

According to an aspect, a lighting device includes: a light source; a surface layer provided at a position facing the light source; and a first reflective member provided between the light source and the surface layer to reflect light emitted from the light source toward the light source. The surface layer has a semi-transmissive layer and a plurality of first openings formed in the semi-transmissive layer. The first reflective member has a plurality of second openings.

2 Claims, 4 Drawing Sheets

LIGHTING DEVICE

CROSS-REFERENCE TO RELATED APPLICATION

This application claims the benefit of priority from Japanese Patent Application No. 2024-084258 filed on May 23, 2024, the entire contents of which are incorporated herein by reference.

BACKGROUND

1. Technical Field

What is disclosed herein relates to a lighting device.

2. Description of the Related Art

Conventionally known are lighting devices that irradiate a veneer with light to cause characters and patterns to be visually recognized (e.g., Japanese Patent Application Laid-open Publication No. 2020-101781 (JP-A-2020-101781)). In JP-A-2020-101781, a surface layer is disposed to cover an LED light source. Characters and patterns composed of light emitted from the LED light source can be visually recognized through the veneer.

In the lighting device disclosed in JP-A-2020-101781, however, the light source is covered by the display layer of the veneer, which may possibly reduce the transmittance.

For the foregoing reasons, there is a need for a lighting device that can improve the transmittance and the light extraction efficiency.

SUMMARY

According to an aspect, a lighting device includes: a light source; a surface layer provided at a position facing the light source; and a first reflective member provided between the light source and the surface layer to reflect light emitted from the light source toward the light source. The surface layer has a semi-transmissive layer and a plurality of first openings formed in the semi-transmissive layer. The first reflective member has a plurality of second openings.

DETAILED DESCRIPTION

Figure 1:
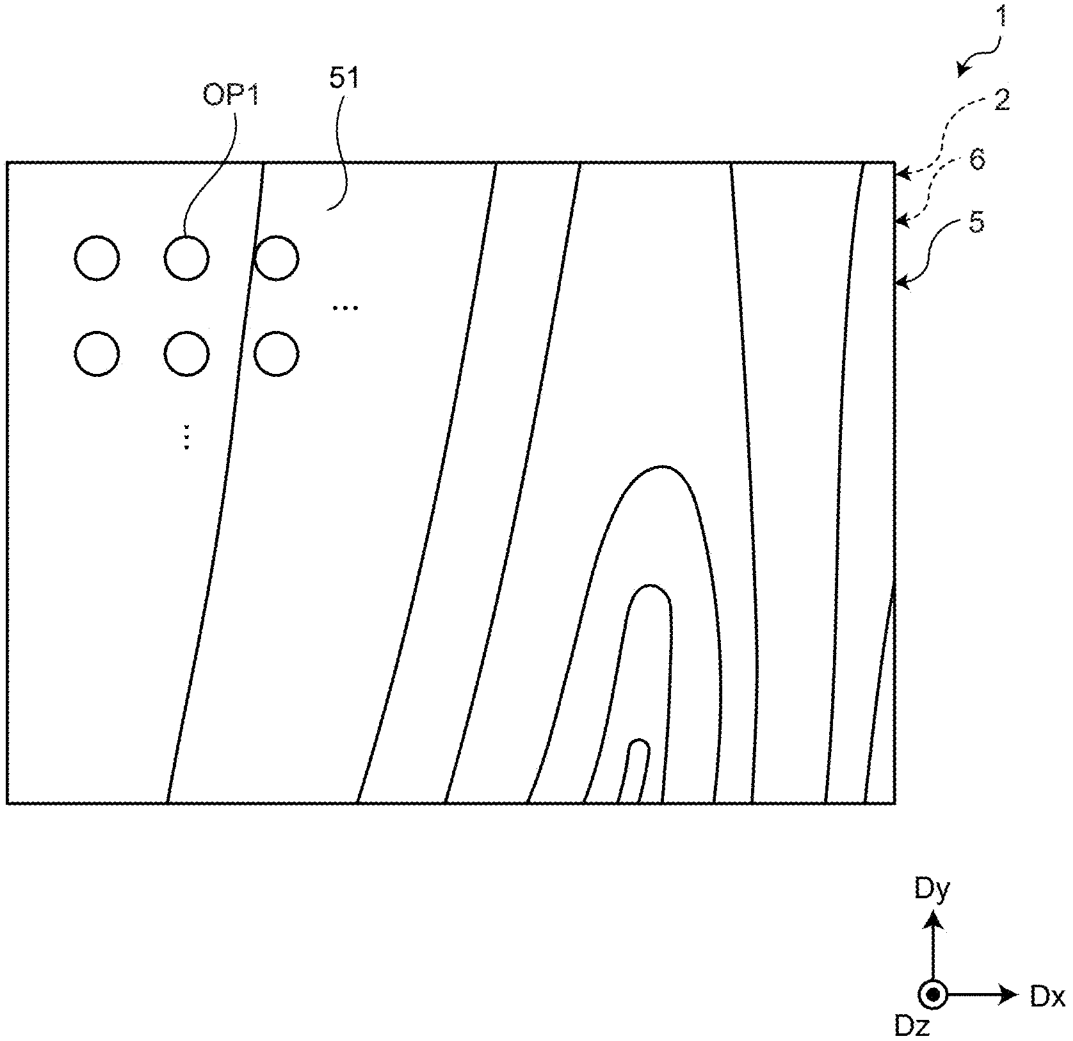
FIG. 1 is a schematic plan view of a lighting device according to a first embodiment.

Exemplary aspects (embodiments) to embody the invention are described below in greater detail with reference to the accompanying drawings. The contents described in the embodiments below are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the invention and easily conceivable by those skilled in the art naturally fall within the scope of the present disclosure. To make the explanation more specific, the drawings may possibly illustrate the width, the thickness, the shape, and other elements of each component more schematically than the actual aspect. These elements, however, are given by way of example only and are not intended to limit interpretation of the present disclosure. In the present specification and the drawings, components similar to those previously described with reference to previous drawings are denoted by the same reference numerals, and detailed explanation thereof may be omitted as appropriate.

In the present specification and the claims, when the term “on” is used to describe an aspect where a first structure is disposed on the upper side of a second structure, it includes both of the following cases unless otherwise noted: a case where the first structure is disposed directly on and in contact with the second structure, and a case where the first structure is disposed above the second structure with still another structure interposed therebetween.

First Embodiment

FIG. 1 is a schematic plan view of a lighting device according to a first embodiment. As illustrated in FIG. 1, a lighting device 1 according to the present embodiment includes a light source 2, a surface layer 5, and a first reflective member 6.

The light source 2 is provided on the back surface of the surface layer 5 with a gap interposed therebetween in plan view and irradiates the surface layer 5 with light. While the light source 2 is a light-emitting diode (LED), for example, it is not limited thereto and may be other components that function in the same manner, such as an organic light-emitting diode (OLED).

The surface layer 5 is, for example, a veneer or plywood made of wood or a veneer molded from wood chips, and the surface of the surface layer 5 has a wood grain pattern, for example. Examples of the wood include, but are not limited to, sycamore wood, maple wood, cherry wood, walnut wood, etc. The thickness of the surface layer 5 ranges 0.2 mm to 0.5 mm.

The surface layer 5 has a semi-transmissive layer 51 and a plurality of first openings OP1 formed in the semi-transmissive layer 51 in plan view. The semi-transmissive layer 51 is a layer with a light transmittance of 1% to 50%, and the light transmittance according to the first embodiment is approximately 3.5%, for example.

In the following description, one direction parallel to the surface of the surface layer 5 is referred to as a first direction Dx, and the other direction parallel to the surface is referred to as a second direction Dy. While the first direction Dx is orthogonal to the second direction Dy, it may intersect the second direction Dy without being orthogonal thereto. The direction orthogonal to the first direction Dx and the second direction Dy, that is, the direction orthogonal to the surface of the surface layer 5 is referred to as a third direction Dz. The third direction Dz corresponds to the normal direction of the light source 2, for example. In the following description, plan view refers to the positional relation when viewed in the third direction Dz.

The first opening OP1 is an opening (hole) formed through the surface layer 5 from a surface 510 of the surface layer 5 on the first side in the third direction Dz to a surface 511 thereof on the second side in the third direction Dz. The openings OP1 are spaced at predetermined intervals along the first direction Dx and the second direction Dy.

The openings OP according to the present embodiment have a circular shape in plan view. The shape of the first openings OP1 illustrated in FIG. 1 is given by way of example only and can be appropriately changed. The first openings OP1 may have a polygonal or square shape in plan view.

The light transmittance can be improved by forming the first openings OP1 on the surface of the surface layer 5. The openings OP according to the present embodiment are arranged in a square lattice in plan view. The arrangement, the number, and the like of the openings OP illustrated in FIG. 1 are given by way of example only and can be appropriately changed. The openings OP may be arranged in any one of a rhombic lattice and a rectangular lattice in plan view.

The first reflective member 6 is disposed at a position overlapping the light source 2 in plan view. The first reflective member 6 is a film-like member made of aluminum or silver, for example.

Figure 2:
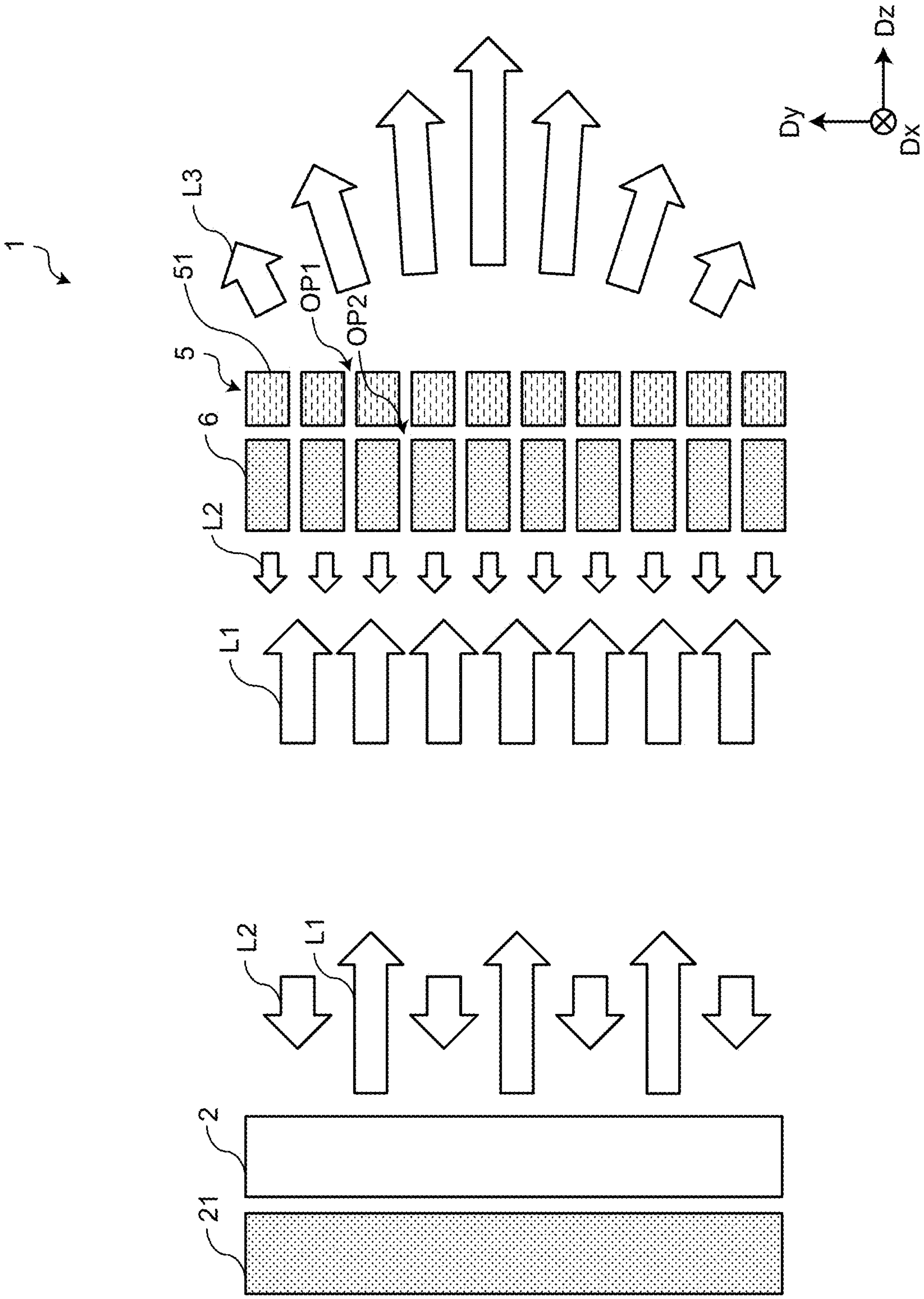
FIG. 2 is a schematic overall view of the lighting device according to the first embodiment.

FIG. 2 is a schematic overall view of the lighting device according to the first embodiment. As illustrated in FIG. 2, the surface layer 5 is provided at a position facing the light source 2.

The first reflective member 6 is provided between the light source 2 and the surface layer 5. The first reflective member 6 has a plurality of second openings OP2. The surface layer 5 and the first reflective member 6 may be bonded by an adhesive or other material or may be disposed with a gap interposed therebetween.

Light L1 output from the light source 2 toward the surface layer 5 in the third direction Dz passes through the second openings OP2 of the first reflective member 6 and the first openings OP1 of the surface layer 5 and is diffused to the outside as diffused light L3.

The first reflective member 6 reflects part of the light L1 as reflected light L2 toward the light source 2 in the third direction Dz. In other words, light that would be absorbed by the surface layer 5 is reflected by the first reflective member 6. The first reflective member 6 has higher light reflectance than the surface layer 5.

With this configuration, the light extraction efficiency can be improved.

The lighting device 1 further includes a second reflective member 21. The second reflective member 21 is positioned opposite to the direction in which the light source 2 emits light toward the surface layer 5.

The second reflective member 21 is provided at such a position that the light source 2 is interposed between the position and the first reflective member 6. The material of the second reflective member 21 is the same as that of the first reflective member 6. The second reflective member 21 reflects the reflected light L2 toward the surface layer 5 in the third direction Dz.

The light reflected by the second reflective member 21 is reused as the diffused light L3, thereby further improving the light extraction efficiency.

If a user views the lighting device 1 in plan view when the light source 2 does not irradiate the surface layer 5 with light, only the surface of the surface layer 5 is visually recognized by the user.

Figure 3:
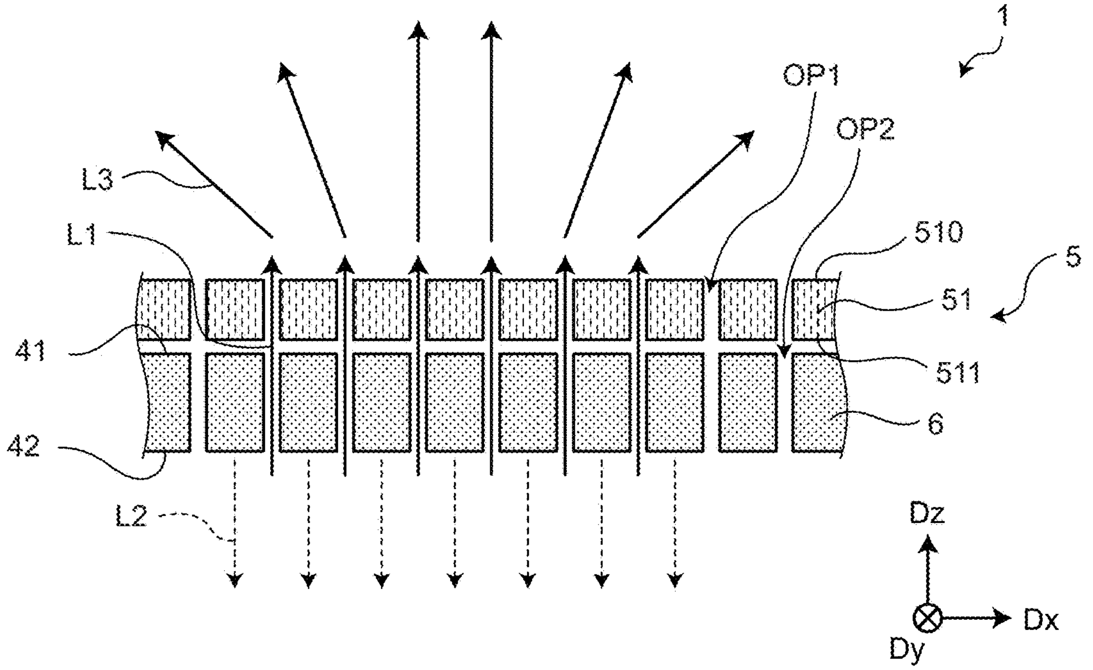
FIG. 3 is a schematic partial sectional view of a surface layer and a first reflective member according to the first embodiment.

FIG. 3 is a schematic partial sectional view of the surface layer and the first reflective member according to the first embodiment. As illustrated in FIG. 3, the first opening OP1 overlaps the second opening OP2 when viewed in the third direction Dz. The second opening OP2 may be larger than the first opening OP1.

This configuration makes the light that has passed through the second opening more likely to pass through the first opening, thereby improving the transmittance.

Modification of First Embodiment

Figure 4:
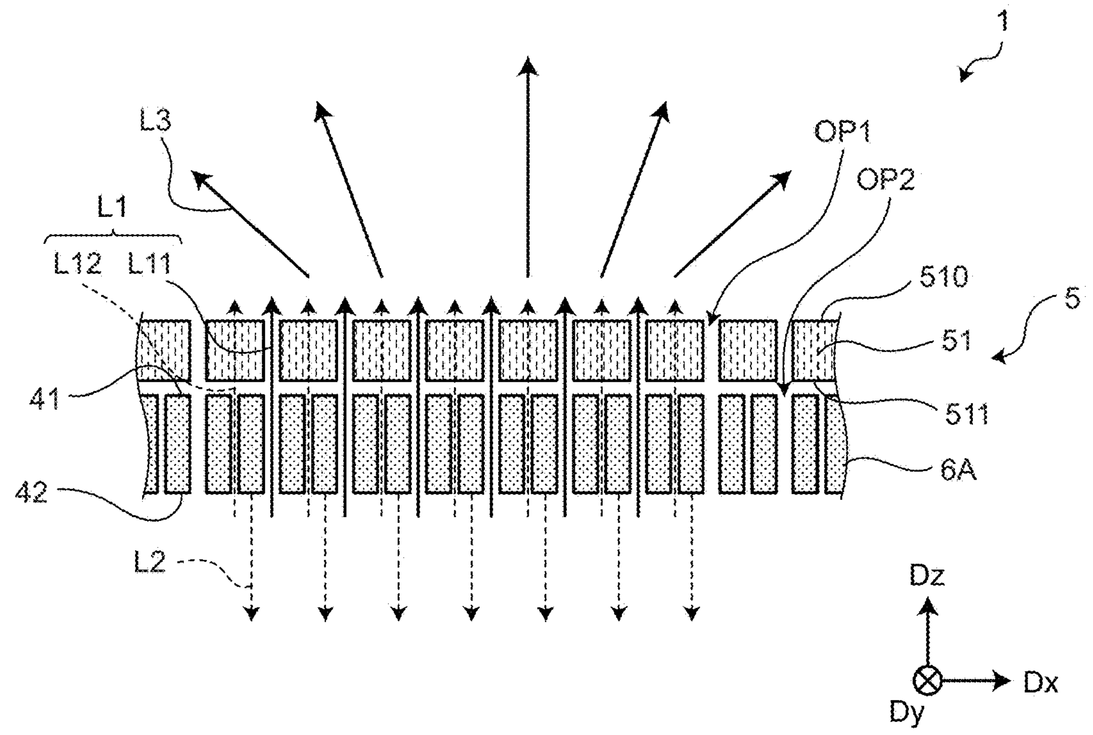
FIG. 4 is a schematic partial sectional view of the surface layer and the first reflective member according to a modification of the first embodiment.

FIG. 4 is a schematic partial sectional view of the surface layer and the first reflective member according to the modification of the first embodiment. In the following description, the same components as those described in the embodiment above are denoted by the same reference numerals, and duplicate explanation thereof is omitted.

As illustrated in FIG. 4, the first reflective member 6A has the second openings OP2 at positions overlapping the first openings OP1 and positions overlapping the semi-transmissive layer 51 when viewed in the third direction Dz.

In a lighting device 1 according to the modification of the first embodiment, the light L1 emitted from the light source 2 includes first light L11 and second light L12. The first light L11 is light that passes through the second opening OP2 and then through the first opening OP1. The second light L12 is light that passes through the second opening OP2 and then through the semi-transmissive layer 51.

The light L1 that has passed through the second opening OP2 passes through the first opening OP1 and the semi-transmissive layer 51 and is diffused to the outside as the diffused light L3. With this configuration, the transmittance is improved compared with a lighting device 1*a* according to a comparative example not having the first openings OP1, which is described below with reference to FIG. 5.

Comparative Example

Figure 5:
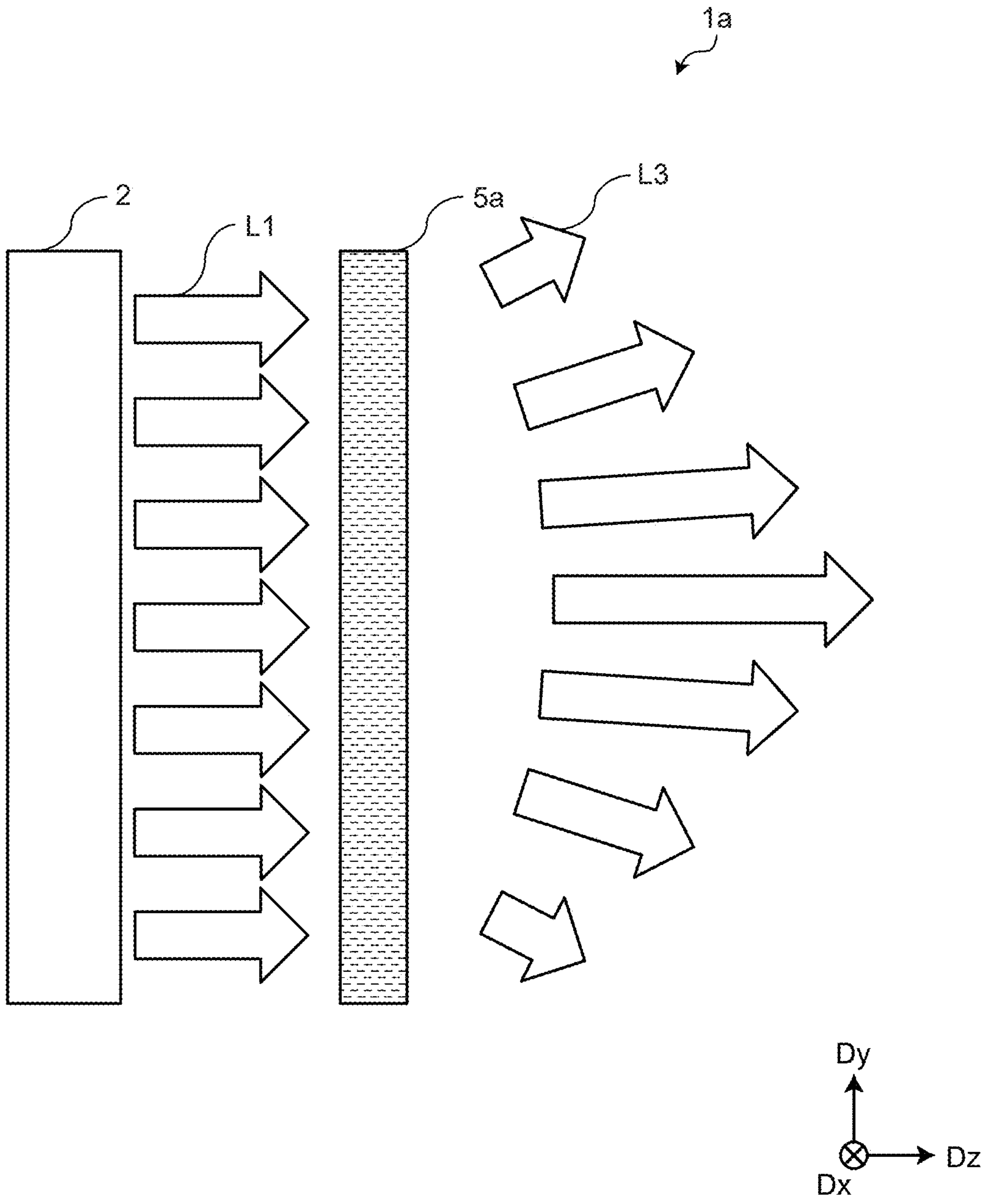
FIG. 5 is a schematic overall view of the lighting device according to a comparative example.

FIG. 5 is a schematic overall view of the lighting device according to a comparative example. In the following description, the same components as those described in the embodiment above are denoted by the same reference numerals, and duplicate explanation thereof is omitted.

As illustrated in FIG. 5, the lighting device 1*a* according to the comparative example does not have a plurality of openings OP1 in a surface layer 5*a* compared with the lighting device 1 according to the first embodiment. The first reflective member 6 is not provided between the light source 2 and the surface layer 5*a*. The second reflective member 21 is not provided opposite to the direction in which the light source 2 emits light toward the surface layer 5*a*.

The lighting device 1*a* has a reflectance of the surface layer 5 of 10% to 15% and has low transmittance. As a result, the lighting device 1*a* is darker as a whole.

By contrast, the lighting device 1 according to the first embodiment has a reflectance of 20% to 30% and has higher transmittance. As a result, the lighting of the lighting device 1 is brighter as a whole.

What is claimed is:

1. A lighting device comprising:

a light source;

a surface layer provided at a position facing the light source;

a first reflective member provided between the light source and the surface layer to reflect light emitted from the light source toward the light source; and a second reflective member disposed at such a position that the light source is interposed between the position and the first reflective member, wherein the surface layer has a semi-transmissive layer and a plurality of first openings formed in the semi-transmissive layer, the first reflective member has a plurality of second openings, the second reflective member reflects second light that is the first light reflected by the first reflective member, toward a surface layer side, the second light reflected by the second reflective member passes through the first openings and the second openings to be diffused outside, and the second openings include:

a first part opening that overlaps one of the first openings, and a second part opening that does not overlap one of the first openings and that overlaps the semi-transmissive layer.

2. The lighting device according to claim 1, wherein the first reflective member has the second openings at positions overlapping the first openings and positions overlapping the semi-transmissive layer.

* * * * *